Patented Aug. 2, 1932

1,869,382

UNITED STATES PATENT OFFICE

RICHARD W. LEWIS, OF MONTCLAIR, AND ALBERT SAUNDERS, OF MAPLEWOOD, NEW JERSEY

BITUMINOUS DISPERSIONS AND METHOD OF MAKING THE SAME

No Drawing. Application filed June 4, 1930. Serial No. 459,259.

This present invention relates to bituminous compositions which are applicable in the arts generally.

More particularly this invention relates to the preparation and use of dispersions of bituminous substances in aqueous media, using as dispersing agents naturally occurring materials known generically as phosphorites or phosphate rock, and including "waste-pond phosphates", these materials being used either alone or in combination with insoluble hydrated oxides.

The phosphatic materials suitable for the practice of our invention may be properly described as being more or less impure forms of amorphous calcium phosphate, and may contain from 21% to 90% $Ca_3(PO_4)_2$. They are usually regarded as being of colloidal origin but as having lost through natural processes of alteration many if not all of their colloidal properties. They are however readily obtained or are preparable in a finely divided state and we have found that such powdered phosphates when previously wetted with water form a highly efficient dispersing agent for effecting dispersions of bitumen in water. Bituminous dispersions so prepared tend to remain in suspension and any sediment which may form is in the form of a soft cake which is readily distributed on simple stirring.

By suitable variations in the dispersion technique the bitumen may be dispersed into a wide range of useful particle sizes and dispersions so obtained have the property, when dried, of suffering little deterioration in the strength and cohesion of their body through exposure to water or to dilute aqueous reagents.

Dispersions prepared by the use of these phosphates alone as dispersing agents will, as stated, form on drying, films, or masses, the resistance of whose body to the action of water is fairly satisfactory. However such dried films may not indefinitely retain under exposure to water their adhesion to certain types of underlying surfaces. This defect can be remedied, according to our invention, by the use of a compound dispersing agent consisting of a fine paste or powder of natural mineral phosphates in which has been mechanically incorporated a sufficient proportion of an insoluble hydrated oxide, preferably artificially prepared hydrated aluminum oxide. Since the hydrated aluminum oxide is an expensive ingredient usually no more is employed than is necessary to secure the desired degree of resistance in the finished material.

The natural phosphates employed in our invention, when compared with other materials such as clay, which have heretofore been used as dispersing agents for bitumen, possess an unique and valuable combination of advantages. As dispersing agents they are equally efficient or are more efficient than is clay. They are cheap and are readily obtainable in suitable physical form, in any desired quantity and in any desired degree of purity and uniformity. They greatly excel clay in the resistance to water offered by the dried dispersions. The discovery, therefore, of their usefulness as dispersing agents for the preparation of dispersions of bitumen-in-water constitutes a new and valuable contribution to the art.

Although dispersons of bitumen-in-water prepared by the use of these natural phosphates alone as dispersing agents will be found valuable and suitable for many applications in the arts generally, and could naturally be used without expensive admixtures whenever possible, dispersions of this type may according to the second feature of our invention, when desired for special purposes, be still further improved by mechanical admixture of insoluble hydrated oxides.

A preferred emulsifying agent for the preparation of bituminous composition which is useful in the arts generally as a waterproofing and protective coating or binding material may comprise, in finely powdered form, such naturally occurring phosphates as Florida or Tennessee hard rock phosphate, or soft phosphate, or pebble phosphate, or waste-pond phosphate. Other naturally occurring insoluble inorganic phosphates may also be used, but the amorphous calcium phosphates of Florida or Tennessee are at present preferred.

For special purposes a second preferred dispersing agent for the preparation of bituminous dispersions useful in the arts generally would comprise a mixture of finely ground natural phosphates as described above together with a substantial proportion of hydrated aluminum oxide. This hydrated aluminum oxide is previously artificially prepared as a gelatinous precipitate which may be used at once or may be carefully dried in such a manner as not to interfere with its chemical hydration and fine state of physical division.

As an example of the practice of our invention there may be taken, say, 200 lbs. of finely ground naturally occurring insoluble inorganic phosphate. This may be made into a thick paste with 200 lbs. of water more or less. To this paste may be added with suitable stirring bitumen in a fluid or semi-fluid state. A particularly useful composition would result from the addition of about 1,000 to 10,000 lbs. of bitumen to the 200 lbs. of phosphate, but it must be recognized that, depending upon the purposes for which the finished dispersion is to be used, the proportion of bitumen to dispersing agent may be varied within very wide limits, so that from 200 to 10,000 or even more pounds of bitumen might be added to 200 lbs. of this agent, depending upon the properties desired in the finished composition.

Another preferred example of the practice of our invention consists in taking one part of finely powdered mineral phosphate, adding thereto sufficient water to make a thick or thin paste or suspension and then intimately mixing with this first suspension a second suspension containing from one to five parts of gelatinous aluminum hydrate together with a suitable amount of water. The gelatinous aluminum hydrate may be reckoned as containing 20% $Al_2(OH)_6$. With suitable agitation there is added to the dispersing mixture so prepared, fluid or semi-fluid bitumen in the proportion of from 1 to 50 or more pounds of bitumen for each pound of anhydrous material or ash in the dispersing mixture.

In each of these examples by interrupting the addition of bitumen at any predetermined point there is obtained a composition which is useful in the arts and which possesses unique and valuable properties which distinguish it from a corresponding composition containing the same amount of bitumen but obtained by the use of other dispersing agents heretofore known. Hence, from 1 to 50 or more parts of bitumen per part of anhydrous agent may be added while the mass is being stirred, the exact amount of bitumen to be added being predetermined by the use to which the material is to be put. More water may be added in such quantity as to obtain the consistency desired.

A batch of composition obtained by practicing the invention may be obtained while the ingredients are either cold or hot, depending upon the particular bitumen employed, and either as an individual batch or as a mother batch for a subsequent continuous or intermittent process.

We claim:

1. The method of dispersing bitumen in water, comprising mixing bitumen, finely divided mineral phosphate, and water.

2. The method of dispersing bitumen in water, comprising mixing bitumen, ground mineral phosphate, insoluble hydrated oxide, and water.

3. The method of dispersing bitumen in water, comprising the step of disintegrating the bitumen by the application of ground mineral phosphate thereto while mixing with water.

4. The method of dispersing bitumen in water, comprising the step of disintegrating the bitumen by the application thereto of a mixture of ground mineral phosphate and insoluble hydrated oxide while mixing with water.

5. The method of dispersing bitumen in water, comprising the step of agitating the bitumen together with the water and a dispersing agent comprising ground mineral phosphate.

6. The method of dispersing bitumen in water, comprising the step of agitatng the bitumen together with water and a dispersing agent comprising a mixture of ground mineral phosphate and hydrated aluminum oxide.

7. In a dispersion of bitumen-in-water, a dispersing agent comprising finely divided ground mineral phosphate.

8. In a dispersion of bitumen-in-water, a dispersing agent comprising a mixture of finely divided ground mineral phosphate and insoluble hydrated oxide.

9. In a dispersion of bitumen-in-water, a dispersing agent comprising a mixture of finely divided ground mineral phosphate and hydrated aluminum oxide.

10. A bituminous dispersion of bitumen in water, comprising water, bitumen, and a dispersing agent therefor comprising finely divided ground mineral phosphate.

11. A bituminous dispersion of bitumen in water, comprising water, bitumen and a dispersing agent therefor comprising a mixture of ground mineral phosphate and an insoluble hydrated oxide.

12. A bituminous dispersion of bitumen in water, comprising water, bitumen and a dispersing agent therefor comprising a mixture of finely divided ground mineral phosphate and hydrated aluminum oxide.

13. A composition of matter containing dispersed bitumen and ground mineral phosphate.

14. A composition of matter containing, when wet, dispersed bitumen, water, ground mineral phosphate and an insoluble hydrated oxide.

15. A composition of matter containing, when wet, dispersed bitumen, water, ground mineral phosphate, and hydrated aluminum oxide.

16. A composition of matter containing, when wet, dispersed bitumen, water and finely divided mineral phosphate.

17. A composition of matter containing finely divided insoluble phosphate, and dispersed bitumen, the proportion of the bitumen being from about one to fifty times the weight of the phosphate.

18. A composition of matter containing one part of finely powdered mineral phosphate, from about one to five parts of gelatinous aluminum hydrate, and from one to fifty or more pounds of dispersed bitumen for each pound of anhydrous material in the composition.

In testimony whereof we hereto affix our signatures.

RICHARD W. LEWIS.
ALBERT SAUNDERS.